P. MUELLER.
GRIPPING NUT.
APPLICATION FILED OCT. 16, 1914. RENEWED JULY 2, 1918.
1,293,865.  Patented Feb. 11, 1919.
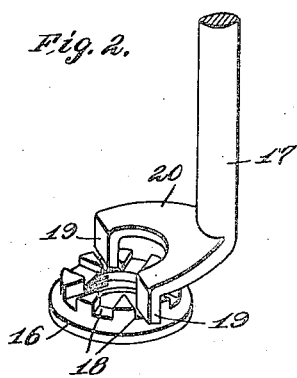
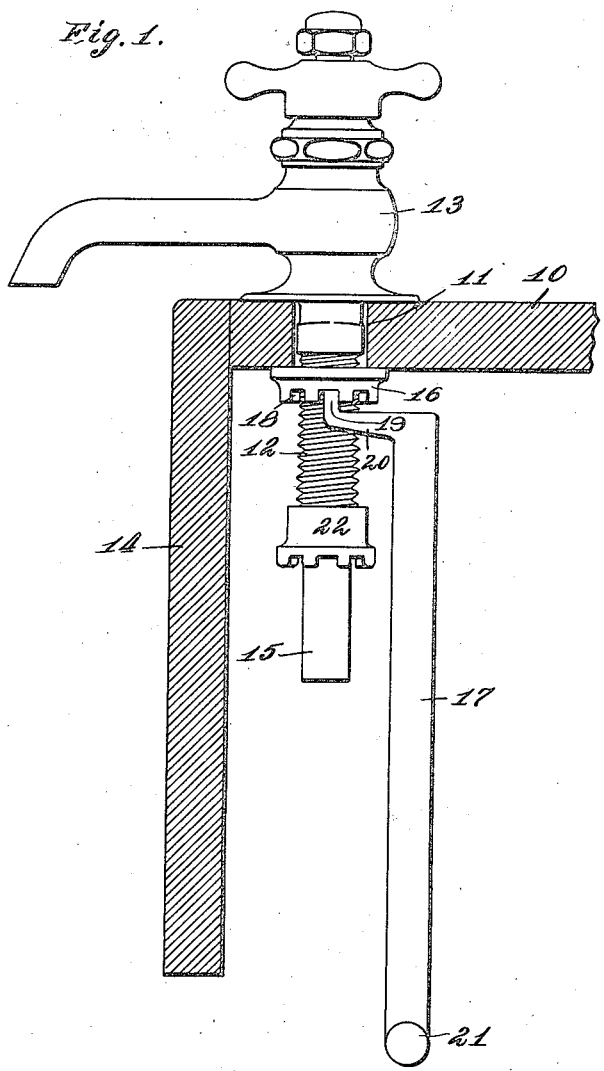
Witnesses
H. C. Roberts
J. T. Mawhinney
Inventor
Philip Mueller
By Meyers Cushman & Rea
Attorney

UNITED STATES PATENT OFFICE.

PHILIP MUELLER, OF DECATUR, ILLINOIS.

GRIPPING-NUT.

1,293,865.   Specification of Letters Patent.   Patented Feb. 11, 1919.

Application filed October 16, 1914, Serial No. 866,973. Renewed July 2, 1918. Serial No. 243,051.

*To all whom it may concern:*

Be it known that I, PHILIP MUELLER, a citizen of the United States, residing at Decatur, in the county of Macon and State of Illinois, have invented new and useful Improvements in Gripping-Nuts, of which the following is a specification.

This invention relates to an improvement in nuts, particularly to locking or coupling nuts, and has for its principal object the provision of nuts of this character which may be very easily positioned and tightened upon the screw-threaded shank or tail-pieces of cocks and faucets when set in lavatory devices for the purpose of connecting the screw-threaded shank or tail-pieces to supply pipes, the connection being made close to the wall and beneath the lavatory member where access can not be had to the nuts with the usual wrench.

The invention has for another object to provide a peculiar form of nut which occupies relatively small space as compared with the size and strength of the nut, and wherein the usual wrench gripping faces are done away with thus reducing the exterior size of the nut and permitting the turning of the nut in relatively small places.

Briefly stated, the invention provides for a circular nut having no protruding angular portions whereby the contour of the nut is circular, and providing the nut in its outer face with diametrically extending slots or recesses which are interrupted by the central threaded opening through the nut. When the nut is applied to the screw-threaded shank, a pipe, or a bolt, a spanner wrench of any suitable type is used, the wrench having lugs adapted to engage in the opposite ends of one of the recesses at the opposite sides of the screw-threaded shank, pipe or bolt.

Other objects and advantages of this invention will appear from the following detail description of the present embodiment of the invention, the same being shown in the accompanying drawing, wherein,—

Figure 1 is a side elevation of a locking nut and a coupling nut made in accordance with this invention and applied to the screw-threaded shank or tail-piece of a cock set up in position upon a lavatory member, a form of spanner wrench being disclosed as applied to the locking nut.

Fig. 2 is a detail perspective view of the locking nut showing the spanner wrench applied thereto.

Referring to this drawing, wherein like parts are designated by similar numerals throughout the several views, 10 designates the table or shelf of a lavatory member having an opening 11 therethrough for the reception of the threaded screw-threaded shank or tail piece 12 of a cock 13, the base of the latter resting upon the shelf or table 10. A wall or side 14 is shown abutting one edge of the shelf or table 10 as illustrating the limited or narrow space within which the coupling of the screw-threaded shank 12 with a supply pipe 15 must be made.

For the purpose of securing the cock 13 upon the shelf 10 a nut is threaded upon the screw-threaded shank 12 and tightened against the lower face of the shelf 10 so as to draw the screw-threaded shank down and bind the cock in adjusted position.

In order that the nut may be easily tightened and adjusted upon the screw-threaded shank to lock the same in position in the relatively narrow space provided for the nut, this invention comprises a peculiar form of nut indicated at 16. The nut 16 comprises a circular disk member of the desired thickness having a central threaded opening adapted to receive the externally threaded screw-threaded shank 12 of the cock, the nut being adapted to be turned upon the screw-threaded shank in the usual manner. It will be noted from Figs. 1 and 2 that the nut 16 has no external angular wrench receiving faces but that the nut is truly circular. This circular contour of the nut admits of the free rotation of the nut in small openings as there are no corners or projections to engage with the walls of the opening and thereby prevent the free rotation of the nut. This nut 16 is adapted to be operated by a spanner wrench such as shown at 17 in Figs. 1 and 2, and for this purpose the nut 16 is provided in its upper face with a plurality of intersecting diametrically extending slots or recesses 18, the same being interrupted only by the central threaded opening of the nut. These slots or recesses 18 thus provide a plurality of pairs of oppositely disposed sockets adapted to receive the spaced apart lugs 19 on the fork 20 of the spanner wrench 17.

From Figs. 1 and 2 it will be noted that the spanner wrench 17 comprises an elongated bar having at its outer end a laterally extending fork adapted to straddle the screw-threaded shank, pipe, or other member to which it is applied, and being provided upon the ends of the fork 20 with the lugs 19 for engagement with the recesses 18 in the nut. The inner end of the wrench 17 is provided with a suitable cross-bar or handle 21 adapted to be engaged by the hand to rotate the spanner wrench.

With a nut of the character described above, it is apparent that the nut may be applied to the screw-threaded shank 12, and the supply pipe 15, in very small or limited spaces, where wrenches and other tools cannot be operated, for these conditions are generally found. It frequently happens that there is not enough room left for even attaching a basin cock to a wash bowl or a coupling nut to a faucet shank by means of what is known as a basin cock wrench.

The greatest difficulty found in installing basin cocks is, that the lock nut 16, cannot be tightened on to the faucet shank 12, satisfactorily with a wrench, and in that case, it is tightened and frequently spoiled using a cold chisel and a hammer, and many times the space is so limited, that the work can hardly be done as last described.

It frequently becomes necessary to detach the basin cocks from wash bowls, and it is a well known fact to those skilled in the art, that in order to detach basin cocks from wash bowls, due to the limited space, it often occurs, that the wash bowl or slab has to be detached from the walls, or taken down and carted to the plumbing shop, where the basin cocks have had to be loosened by special tools. These are some of the difficulties encountered in fastening a basin cock to a wash bowl and coupling a supply pipe to a faucet shank, respectively, with the present type of basin cock lock nuts and coupling nuts and which are entirely obviated by this invention. This invention does not make it necessary to make a space for rotating a wrench or other tool. The design of these basin cock lock nuts and coupling nuts, together with the special type of spanner wrench, makes it possible to lock a basin cock to a wash bowl and, to connect a supply pipe to a faucet shank in a very limited space.

Another advantage of this invention is, the fact that both the basin cock lock nut and basin cock coupling nut can be attached with the same wrench, and can also be detached, avoiding all difficulties mentioned, for it is only necessary to insert the spanner wrench up into the small space and engage the lugs 19 thereof, in the slots 18 of the nut, and then turn the spanner-wrench, holding the latter substantially parallel with the pipe or screw-threaded shank.

What is claimed is—

A nut comprising a circular body having a threaded central bore whereby the nut may be attached to the screw-threaded shank of a faucet, and one plane face, the other face provided with wrench-receiving recesses, one end of each recess opening at the central bore and the other at the outer edge of the face, said recesses arranged completely around the nut but set back from the circumferential periphery of the plane face of the body and adapted to receive the lugs of the usual spanner wrench lying parallel with the axis of the nut, whereby the nut is readily operated in close and otherwise practically inaccessible locations.

In testimony whereof I have hereunto set my hand in presence of two subscribing witnesses.

PHILIP MUELLER.

Witnesses:
MABEL McINTYRE,
CHARLES G. AUER.